United States Patent [19]

Lewis

[11] 4,443,344
[45] Apr. 17, 1984

[54] METHOD FOR RECOVERING SOLVENT

[76] Inventor: John O. Lewis, 732 The Strand, Hermosa Beach, Calif. 90254

[21] Appl. No.: 486,348

[22] Filed: Apr. 19, 1983

Related U.S. Application Data

[63] Continuation-in-part of Ser. No. 276,950, Jun. 24, 1981, abandoned.

[51] Int. Cl.$^3$ .............................................. B01D 27/12
[52] U.S. Cl. .................................... 210/774; 210/791; 210/797; 203/96; 34/37
[58] Field of Search ...................... 8/142; 134/14, 25.1, 134/31; 203/9, 10, 39, 95, 96; 210/767, 774, 791, 800, 804, 797; 34/37

[56] References Cited
U.S. PATENT DOCUMENTS

| | | | |
|---|---|---|---|
| 3,089,250 | 5/1963 | Victor | 203/95 X |
| 3,352,763 | 11/1967 | Shields | 203/96 X |
| 3,362,888 | 1/1968 | Ricigliano | 34/37 X |
| 3,421,835 | 1/1969 | McCarty | 210/791 X |
| 3,438,497 | 4/1969 | Maestrelli | 210/791 |

Primary Examiner—Thomas G. Wyse
Attorney, Agent, or Firm—Edward A. Sokolski

[57] ABSTRACT

A solvent recovery method for removing cleaning solvent from dirty, solvent-laden filter cartridges. The cartridges are placed in a low temperature, water vapor environment. Water vapor passing through the cartridges combines with and replaces the solvent in the cartridges and is then condensed into liquid form. The liquid is deposited in a stratum-forming separator. The water is bled-off to form makeup water in the water vapor environment and the solvent is bled-off from the separator in to a receiving tank from which it may be selectively drawn.

12 Claims, 1 Drawing Figure

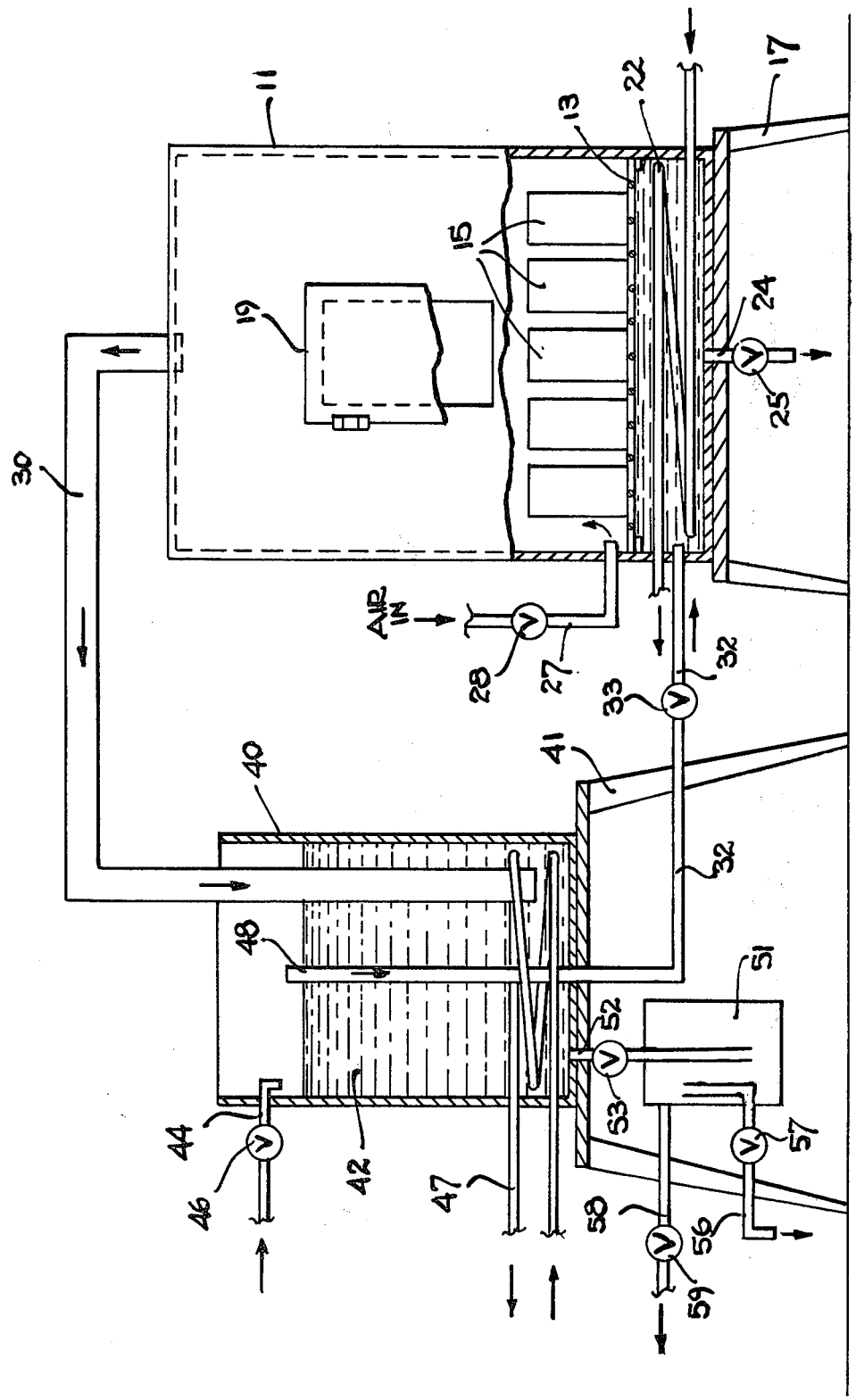

METHOD FOR RECOVERING SOLVENT

This application is a continuation-in-part of my application Ser. No. 276,950, filed June 24, 1981, now abandoned.

The present invention relates to a method for recovering solvent from filter cartridges in order to reclaim the solvent and allow the cartridges to be disposed of safely, and more particularly to such a method suitable for use in the dry cleaning industry for recovering cleaning solvent.

Most dry cleaners utilize perchlorethylene in a tumbling bin or cleaning machine for cleaning clothing and loosening water soluble dirt, spots, and stains on the clothing. A small amount of water is mixed with the solvent to remove the stains and soil. In most cases, a relatively small volume of soap is employed in the mixture in order to improve the quality of the water-solvent mix and to allow the mixture to pass through filters which capture the soil, etc., when the cleaning is completed.

When clothing has been tumbled in the solvent for the required length of time, the water-soap-solvent mixture is withdrawn from the cleaning machine through a filter so that the soil and other foreign matter can be removed from the mixture. The mixture is then passed to a storage container or sump for use with the next batch of clothing to be tumbled.

The filter cartridges through which the mixture is passed eventually become heavily laden with the soil and other foreign matter which is carried out of the cleaning machine by the mixture. In most instances, the operator can tell that the cartridges are filled with dirt when it takes longer than approximately two minutes to fill the machine with the cleaning solution when a new batch of clothing is inserted. When these conditions occurred in the past, the operator simply removed the cartridges from the filter, replaced them with new cartridges, and threw the used cartridges away.

Recently, environmental considerations relating to toxicity and fire hazard have made this solution totally unacceptable. Further, the impact of inflation has rendered this solution less desirable since solvent currently costs approximately $4.00 per gallon. Consequently, if possible, it is preferable that such solvent not be simply "thrown away" if that can be avoided.

A company called Kleen-Rite, Inc., has manufactured a solvent extractor system which heats the cleaning liquid mixture to approximately 190° F., or more, during the filtration process. However, this high temperature is above that which perchlorethylene can tolerate without a change in form. For example, the 190° F. temperature normally results in the cleaning mixture becoming very milky in appearance and, consequently, unacceptable for further use as a cleaning fluid.

A need therefore exists in the industry for a method which will reclaim all or substantially all of the solvent from a spent cartridge so that the solvent can be reused and the cartridge can be safely disposed of in an environmentally safe manner.

The present invention overcomes the shortcomings of the prior art to provide a highly effective and efficient method for separating a solvent from a filter containing soil, solvent, soap, water, and various foreign materials. It has been found, through the use of the method of the invention, that up to 1½ gallons of reclaimable perchlorethylene can be recovered from the type of filter cartridge normally used in the industry today when that cartridge has become filled with dirt-laden solvent after normal usage.

According to the present invention, one or more cartridges may be installed in the bottom of a main tank or container. Water may be dropped at low rates onto a coil in the tank to burst into a low temperature steam. For example, if the coil contains low temperature steam at about 7 psig, water heated by the coil will be converted into steam with a temperature of about 230° F. An air stream may be provided to induce movement of the steam away from the coil which will reduce its temperature to about 135° F.—but still in the form of steam—at a distance of about 8 inches away from the coil. Thus, the temperature of the steam reaching the cartridge will be well below that which changes the form of the solvent. In practice, it has been found that the feed rate of the water to the coil is, preferably, about 2–3 gallons per hour.

In the preferred embodiment of this invention, the cartridges are located generally above the coil in the container so that as the steam rises, it will pass through the cartridges and mix and combine with the solvent and dirt in the cartridges. As a result, a water-solvent vapor will rise in the tank under the influence of an air stream which may be introduced into the bottom of the tank. The use of the air stream will not only allow the vapor to be moved, but also will allow the operation to be accomplished at a sufficiently low temperature so that the solvent will not change its form and become unusable.

As the water-solvent vapor is drawn out of the container, it is passed into a condenser chamber so that it is transformed to a water-solvent liquid. Of course, those skilled in the art will realize that, if desired, the condenser may be integral with or at the upper end of the container.

The water-solvent liquid at the bottom of the condenser chamber is fed to a separator tank which is mounted below the condenser chamber. The solvent, which is heavier than water, gravitates to the bottom of the tank and can be drawn off by means of a valve at the lower end of the tank.

The condenser chamber may be arranged so that, near the upper end thereof, an overflow pipe is provided which is connected to a line which runs out of the receiving tank, through a check valve, and back to the lower portion of the main tank in order to replenish the water which is heated to form the initial vapor.

Thus, the present invention provides a method for recovering solvent in a manner not heretofore possible while, at the same time, allowing used filter cartridges to be substantially entirely drained of toxic solvents such as perchlorethylene.

Those skilled in the art will realize, of course, that the invention as described and claimed in this application may be implemented by means of a wide variety of structures, many of which may not even resemble that described and illustrated here.

The sole FIGURE is a schematic illustration of a device which may be used to carry out the method of the invention.

Referring to the drawing, a main tank 11 is provided, this tank being supported on stand 17. A shelf 13 is provided within the tank and on this shelf a plurality of cartridges 15 are placed, these cartridges being of the type employed in a filter for a dry-cleaning machine. Cartridges 15 contain dirt-laden solvent, the solvent typically being perchlorethylene which is commonly used in dry cleaning. A door 19 is provided in the side of tank 11 to afford access to the interior of the tank. Mounted in the tank underneath shelf 13, which shelf is a grill-type shelf having ample space between the structural members thereof to permit the passage of vapor, is a heating coil 22. This coil is heated to a temperature above the atmospheric vaporization temperature of water by passing steam therethrough. A drain pipe 24, which has a valve 25 installed therein, is located in the bottom of the tank for draining liquid out of the tank as may be required. An inlet pipe 27 is provided at the bottom of the tank for feeding an air stream into the tank, which, as to be explained further on in the specification, is used to aid in driving the stream to the top of the tank and out therefrom through outlet pipe 30. An inlet pipe 32, having a valve 33 installed therein, is provided at the bottom of tank 11 in the region of heating coil 22 for feeding water into the tank to generate vapor.

A condenser chamber 40 is mounted on stand 41 and is filled with water 42 by means of water inlet pipe 44, which has a valve 46 installed therein. Installed in the bottom of condenser tank 40 is a cooling coil 47 which is maintained at a temperature of approximately 70° F. by feeding cool water thereto. Water outlet pipe 30 extends down into chamber 40 to the region of cooling coils 47. An overflow pipe 48 is installed in chamber 40, this pipe running through the bottom of the tank and connecting with the water inlet line 32 for tank 11. Mounted beneath stand 41 below condenser chamber 40 is a separator tank 51. This tank is connected by means of pipe 52 to the bottom of chamber 40. A valve 53 is installed in pipe 52. An outlet line 56 is installed in the bottom portion of separator tank 51, this outlet line having a valve 57 installed therein. An outlet line 58 is installed in the top portion of tank 51, line 58 having a valve 59 installed therein.

In implementing the method of the invention, the device shown in the FIGURE is operated as follows: Initially, all of the valves, i.e., 25,28,33,53,57,59, and 46, are closed. Door 19 is opened and cartridges 15 are placed on shelf 13 and the door 19 tightly closed. Water valve 46 is then opened and tank or chamber 40 filled with water to its very top, above the top of overflow pipe 48. Valve 33 is now opened to permit water to flow through the overflow pipe and lines 32 into the bottom of tank 11. The water will continue to flow until its reaches the level of the top of overflow pipe 48 in tank 40. Steam is now fed to steam coil 22, this steam being at a temperature of about 235° F. Valve 28 is now opened to permit the air stream to flow into tank 11, this air stream being adjusted to provide suitable upward sweep of the vapor. The water entering the bottom of tank 11 through line 32 is vaporized by the heating coil 22, the vapor saturating cartridges 15 and mixing with the solvent in the cartridges to form a solvent-water vapor mixture. The vapor in being swept away from the heating coil is reduced in temperature to about 135° F. at which temperature it will not cause deterioration of the solvent. Vapor temperatures of 175° F. and below have been found not to adversely affect perchlorethylene and may be employed. It has been found, however, that with temperatures above 175° F. the perchlorethylene tends to become milky and is unacceptable for re-use. The solvent-water varpor is swept upwardly in tank 11 by the air stream fed to the tank from line 27 and passes out of the tank through outlet line 30 and into condenser chamber 40 through this line. The vapor entering tank 40 through line 30 is condensed by the cooling action of cooling coils 47 and converted into liquid form. After the system has been run for a period of time, typically about 24 hours, valve 53 is opened to permit the liquid at the bottom of chamber 40 to drain into separator tank 51. The heavier solvent will gravitate to the bottom of separator tank 51 while the water will be at the top of the tank. Vavle 59 can initially be opened to determine whether or not tank 51 is filled with solvent or whether there is water at the very top thereof. If the separator tank is filled with solvent, valve 53 can be closed and the solvent drained out of the separator tank through line 56 by opening valve 57. If there is water at the top of the separator tank, care should be taken in draining the solvent out to be sure that such draining is terminated promptly when water reaches the bottom of the separator tank.

To be sure of removing all of the solvent from the cartridges, the device should then be run for another 24 hours. Usually, however, if water appears at the top of separator tank 51, as indicated when valve 59 is opened, all of the solvent has been removed and the cartridges can then be discarded.

While the method of the invention has been described and illustrated in detail, it is to be clearly understood that this is intended by way of illustration and example only, the spirit and scope of the invention being limited only by the terms of the following claims.

I claim:

1. A method for recovering a solvent which has a weight different from that of water from a filter cartridge containing said solvent laden with foreign matter comprising the steps of
    placing said cartridge in a first tank having a heating device therein,
    at least partially filling a second tank with water,
    feeding water from said second tank to said first tank to the area of said heating device but so as not to immerse said cartridge,
    raising the temperature of said heating device sufficiently to cause at least a portion of the water in the first tank to be converted to vapor, the cartridge being saturated with vapor such that the vapor mixes with the solvent to form a water-solvent vapor mixture,
    feeding the water-solvent vapor mixture from said first tank to said second tank,
    condensing the water-solvent vapor mixture in said second tank to water and solvent in liquid form, the heavier of the liquids gravitating to the bottom of the second tank and thus being separated from the lighter liquid, and
    removing the solvent from the second tank.

2. The method of claim 1 wherein the solvent is heavier than water and further including the step of feeding the solvent and some of the water from the bottom of the second tank to a separator tank and removing the solvent from the bottom portion of the separator tank.

3. The method of claim 1 wherein the heating device is a steam coil installed in the bottom portion of the first tank and further including the step of feeding preheated steam to said coil to raise the temperature thereof.

4. The method of claim 1 wherein an air stream is fed into said first tank to facilitate the feeding of the water-solvent vapor mixture to said second tank and to lower the temperature of the water vapor sufficiently to obviate deterioration of the solvent.

5. The method of claim 3 wherein said cartridge is placed in said tank immediately above the heating coil.

6. The method of claim 1 wherein there is an overflow pipe having an inlet installed in said second tank, water being fed from said second tank to said first tank through said overflow pipe, said second tank being initially filled above the level of the inlet of said overflow pipe such that water flows from said second tank to said first tank until the water in the second tank reaches said overflow pipe inlet level, water subsequently flowing from said second tank to said first tank as the water-solvent vapor mixture is condensed to liquid form in said second tank to raise the liquid level in said second tank.

7. The method of claim 1 wherein said solvent is perchlorethylene, the cartridge being removed from a dry cleaning machine.

8. The method of claim 7 wherein an air stream is fed into said first tank to both lower the temperature of the water vapor sufficiently to avoid damage to the solvent without condensing the water-solvent vapor mixture and to facilitate the movement of said vapor mixture from the first tank to the second tank.

9. The method of claim 8 wherein the water vapor temperature is lowered to between 135° F. and 175° F.

10. A method for recovering perchlorethylene solvent from a filter cartridge containing said solvent laden with dirt comprising the steps of installing a heating element in the bottom of a first tank, placing said cartridge in said first tank directly above said heating element, installing an overflow pipe in a second tank, said overflow pipe having an inlet in said second tank near the top of said second tank and running from said second tank to a point in said first tank directly above said heating element, filling said second tank to a level substantially above that of said overflow pipe inlet, water thereby running through the overflow pipe to the first tank, heating the heating element sufficiently to vaporize water in said first tank, the water vapor mixing with the perchlorethylene solvent in said cartridge to form a water-solvent vapor mixture, driving the water-solvent vapor mixture away from the cartridge and through a pipe to said second tank, condensing the water solvent vapor mixture to liquid form in said second tank, the solvent being heavier than the water and gravitating to the bottom of the second tank, and draining off the solvent from the bottom of the second tank.

11. The method of claim 10 wherein the water vapor temperature when it mixes with the solvent is no greater than 175° F.

12. The method of claim 10 wherein the water-solvent vapor mixture is driven away from the cartridge and through the pipe by means of an air stream fed into the first tank.

* * * * *